(12) United States Patent
Stieger et al.

(10) Patent No.: US 10,767,693 B2
(45) Date of Patent: Sep. 8, 2020

(54) ROTATION SYSTEM HAVING RADIAL GAS BEARING

(71) Applicant: FISCHER ENGINEERING SOLUTIONS AG, Herzogenbuchsee (CH)

(72) Inventors: Werner Stieger, Oensingen (CH); Rolf Boller, Sissach (CH); Simon Hager, Bern (CH); Roy Studer, Hubersdorf (CH)

(73) Assignee: FISCHER ENGINEERING SOLUTIONS AG, Herzogenbuchsee (CH)

( * ) Notice: Subject to any disclaimer, the term of this patent is extended or adjusted under 35 U.S.C. 154(b) by 0 days.

(21) Appl. No.: 16/462,640

(22) PCT Filed: Nov. 20, 2017

(86) PCT No.: PCT/EP2017/079721
§ 371 (c)(1),
(2) Date: May 21, 2019

(87) PCT Pub. No.: WO2018/095841
PCT Pub. Date: May 31, 2018

(65) Prior Publication Data
US 2020/0063795 A1  Feb. 27, 2020

(30) Foreign Application Priority Data
Nov. 22, 2016 (EP) ...................................... 1620022

(51) Int. Cl.
*F16C 32/06* (2006.01)
(52) U.S. Cl.
CPC ...... *F16C 32/0607* (2013.01); *F16C 2360/44* (2013.01)

(58) Field of Classification Search
CPC ........ F16C 17/02; F16C 17/03; F16C 17/035; F16C 17/32; F16C 17/0603;
(Continued)

(56) References Cited

U.S. PATENT DOCUMENTS 3,395,949 A * 8/1968 Kun ........................ F01D 25/22
                                                          384/119
4,005,914 A * 2/1977 Newman ................ F16C 17/024
                                                          384/103
(Continued)

FOREIGN PATENT DOCUMENTS

CH        658 499 A5    11/1986
DE       84 07 526 U1    6/1984
(Continued)

OTHER PUBLICATIONS

European Search Report Corresponding to 16200022.8 dated Mar. 22, 2017.
(Continued)

*Primary Examiner* — Phillip A Johnson
(74) *Attorney, Agent, or Firm* — Davis & Bujold PLLC; Michael J. Bujold

(57) ABSTRACT

A rotation system (10) containing a housing (11), a shaft (12) rotatable relative to the housing (11), and at least one bearing assembly (51) which has a first region (52) supporting the shaft (12) by a radial gas bearing. An air gap is formed between the bearing assembly (51) and the shaft (12). The first region (52) contains or is formed by a tubular radial bearing bushing (55). An inside of the radial bearing bushing (55) has a bearing surface (66) which supports the shaft (12) in the radial direction. The bearing assembly (51) has a third region (54) which is held by or integrated on or in the housing (11) and a second region (53) connects the first region (52) to the third region (54). The second region (53)
(Continued)

Figure 1:
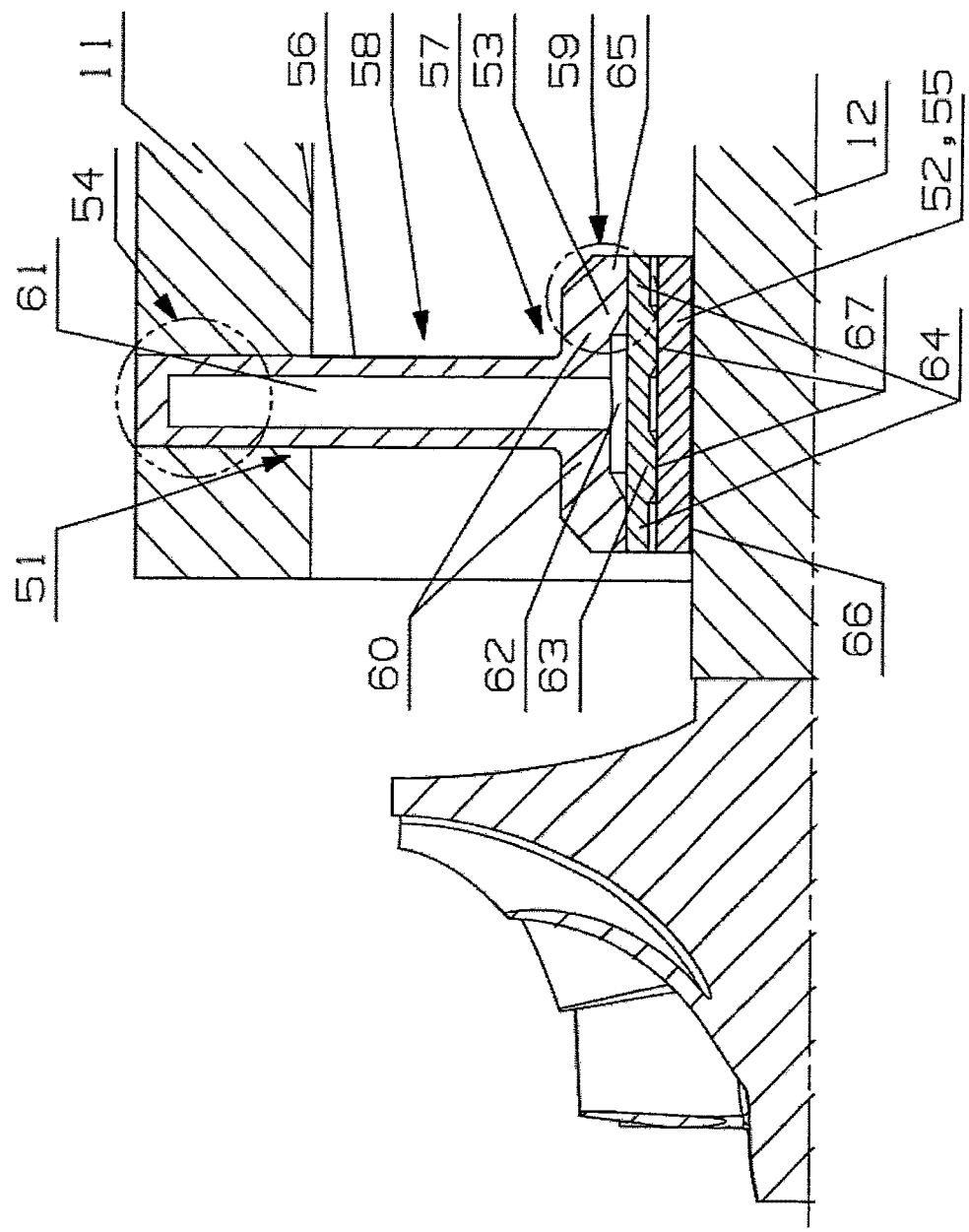

is more elastic than the first region (52) due to its shape or the shape of the first region (52).

19 Claims, 8 Drawing Sheets

(58) Field of Classification Search
CPC .............. F16C 17/0607; F16C 17/0614; F16C 17/0666; F16C 17/067; F16C 17/0677
See application file for complete search history.

(56) References Cited

U.S. PATENT DOCUMENTS

| | | | | |
|---|---|---|---|---|
| 4,045,098 A | * | 8/1977 | Blondeel | B65G 51/03 384/104 |
| 4,099,799 A | | 7/1978 | Etsion | |
| 4,648,475 A | | 3/1987 | Veglia | |
| 5,066,144 A | | 11/1991 | Ide | |
| 9,746,029 B1 | * | 8/2017 | Mook | F16C 32/0622 |
| 9,926,975 B2 | * | 3/2018 | Smedresman | F16C 27/045 |
| 2015/0104124 A1 | | 4/2015 | Delgado Marquez et al. | |

FOREIGN PATENT DOCUMENTS

| | | | |
|---|---|---|---|
| EP | 0 343 620 A2 | 11/1989 | |
| EP | 0 558 850 A2 | 9/1993 | |
| GB | 1192354 A * | 5/1970 | .............. F16C 17/03 |
| WO | 2013/079896 A1 | 6/2013 | |
| WO | 2014/120302 A2 | 8/2014 | |
| WO | 2017/202941 A1 | 11/2017 | |

OTHER PUBLICATIONS

International Search Report Corresponding to PCT/EP2017079721 dated Jan. 22, 2018.
Written Opinion Corresponding to PCT/EP2017079721 dated Jan. 22, 2018.

* cited by examiner

ROTATION SYSTEM HAVING RADIAL GAS BEARING

This invention concerns a rotary system with at least one radial gas bearing.

Rotary systems with radial gas bearings comprise a housing, a shaft rotatable relative to the housing and at least one bearing assembly which supports the shaft relative to the housing by a radial gas bearing. The bearing assembly contains at least one bearing surface within which the shaft is supported. A gas gap is formed between the shaft and the bearing surface, in particular an air gap, which provides the gas bearing.

Document CH 658 499 A5 discloses a resilient bearing device for shaft bearings of high-speed rotors, such as turbomachinery. The bearing device is composed of polygonal spring elements and washers to limit the shaft deflection at the bearing point. The spring elements contain spring rods and spring joints and are press-fitted onto a ball bearing outer ring or bushing which accommodates the ball bearing. This allows the rotor to absorb forces acting on the shaft bearing transversely to the rotor shaft axis. However, high temperatures, high temperature differences or other especially variable operating influences can lead to considerable distortion of the individual parts of the bearing arrangement. For example, at high temperatures, the housing may deform, causing the bearing surfaces to lose their roundness and cylindricity, or impairing coaxiality.

Document DE 84 07 526 U1 concerns an engine unit for a vehicle. It contains a bearing with a rolling bearing and an elastically deformable elastomeric intermediate sleeve which connects a housing and an outer rolling bearing ring. However, high temperatures, high temperature differences or other particularly variable operating influences can also lead to considerable distortion of the individual parts of the bearing arrangement in this type of bearing arrangement, whereby the bearing surfaces can lose their roundness and cylindricity or the coaxiality can be impaired.

For gas bearings, it is crucial that the dimensions of the gas gap remain as constant as possible. A gas gap that is too wide would locally reduce the gas pressure, so that the bearing would be unstable. If the gas gap is too narrow, the bearing surface may come into contact with the shaft. This can lead to the destruction of the entire rotary system, especially at high rotation speeds. However, many rotary systems are often exposed to high temperatures and/or high temperature differences and/or other particularly variable operating influences, such as variable gas pressures or centrifugal forces. This can lead to considerable distortion of individual parts of the rotary system. For example, the housing can deform at high temperatures, which transfers to the bearing surface of the bearing assembly. For example, the bearing surface of the bearing assembly may lose its roundness and cylindricity, or the bearing surface and shaft may lose their coaxiality. Overall, safe operation of the rotary system can then no longer be guaranteed.

In many rotary systems, the outside diameter of the shaft and the inside diameter of the bearing surface and thus the width of the gas gap are also specified, which precludes the use of many state-of-the-art solutions.

Document US 2015/0104124 A1 deals with gas bearings that are used, among other things, for turbomachinery. The turbomachine contains a housing and a shaft which is surrounded by four bearing segments which are supported by the housing by respective spring arrangements.

However, due to the relative mobility of the bearing segments to each other, deformations of the gas gap can occur under extreme operating conditions. In addition, the gas gaps under each of the four bearing segments can be adjusted differently, which in dynamic operation can lead to asymmetry in the bearing arrangement and unstable behavior. It can also happen that the individual bearing segments are excited at their natural frequency at high speeds, which also prevents stable operation. Unstable behavior can easily lead to bearing failure if the width of the gas gap drops to zero and the shaft touches the bearing surface during rotation. Furthermore, the bearing segments can shift when the housing is excited more strongly (e.g. when it vibrates from the outside), which can lead to an undesired dynamic change in the bearing rigidity.

WO 2013/079896 A1 concerns gas bearing arrangements for spindles. The assembly comprises a housing region and an inner radial bearing region resiliently disposed relative to the housing region.

In WO 2014/120302 A2, a compensation for a gas bearing is disclosed. For this purpose, the gas bearing contains a large number of flexible bearing elements which can guide the gas. Examples include a bearing ring, a hub and a bearing element with several bearing plates which are connected to an inner region of the bearing element via resilient arms.

EP 0 343 620 A2 discloses hydrodynamic bearings, including gas bearings. An embodiment is disclosed which contains a housing on which several bearing plates are formed which support a shaft. This also leads to tilting of the bearing plates relative to each other.

The bearing unit disclosed in U.S. Pat. No. 4,099,799 contains a housing to which four bearing segments are spring-mounted, which can cause the disadvantages already described above in connection with US 2015/0104124 A1.

Document U.S. Pat. No. 5,066,144 also discloses hydrodynamic bearings, including gas bearings. During rotation, however, the bearing elements shown there are deliberately deformed, which impairs the constancy of the bearing gap.

It is an object of the present invention to provide an improved rotary system which meets the mentioned requirements as far as possible even at high rotation speeds and/or high temperatures and/or high temperature differences and/or further in particular variable operating influences, such as variable gas pressures or centrifugal forces. The gas gap formed between the bearing assembly and the shaft, in particular the air gap, should therefore remain as constant as possible, i.e. as independent of these conditions as possible, even under these conditions. In particular, the bearing surface of the bearing assembly should remain as round and cylindrical as possible, and the bearing surface and the shaft should remain as coaxial as possible.

These and other tasks are solved by the rotary system according to the invention. This rotary system comprises a housing, a shaft rotatable relative to the housing and at least one bearing assembly which has a first region supporting the shaft and which supports the shaft relative to the housing by a radial gas bearing. A gas gap, especially an air gap, is thus formed between the bearing assembly, in particular the bearing surface described below, and the shaft. The radial gas bearing arrangement can be an aerodynamic gas bearing arrangement, an aerostatic gas bearing arrangement or a tilting pad gas bearing arrangement or a foil bearing arrangement.

The first region of the bearing assembly contains or is formed by a radial bearing sleeve supporting the shaft in the radial direction. The inner side of the radial bearing sleeve has a bearing surface within which the shaft is mounted. Here and in the following, the radial bearing sleeve is preferably understood as "tubular" if its bearing surface continuously surrounds the shaft in the circumferential direction and the radial bearing sleeve has a substantially constant thickness in the radial direction. The wording "substantially constant thickness" does not rule out the possibility that the inside and/or outside of the radial bearing sleeve may have, for example, webs described in more detail below and/or cooling channels inside the radial bearing sleeve which may serve as gas ducts. In particular, the radial bearing sleeve can have a circular cylinder shell. Alternatively, the radial bearing sleeve could also be tubular, e.g. with hexagonal cross-sectional shape.

Due to the tubular shape of the bearing sleeve, it is particularly effective to ensure that the inside of the radial bearing sleeve is relatively little deformed even under extreme operating conditions, so that the gas gap remains extremely constant. In particular, there can be no tilting of several bearing segments and no other of the disadvantages described above, as can occur with several of the above-mentioned state of the art documents.

In accordance with the invention, the bearing assembly has a first region extending the shaft and a third region held by the housing or integrated on or in the housing, the bearing assembly having a second region connecting the first region to the third region, which second region is more elastic than the first region at least due to its shape and/or due to a shape of the first region. The inner region can contain the previously mentioned bearing surface within which shaft is mounted.

The shape of the second region can, for example, be achieved by geometrically weakening the material of the second region. Such a geometric material weakening can be formed by at least one recess formed in the axial direction or at least one opening penetrating the bearing assembly. The cavity can be formed, for example, by a laser-sintered structure, a bore, an axial recess, a laser structure, a casting rib and/or a milled kidney. For example, the recess or opening may be formed in a spacer flange described in detail below, for example in an outer section of such a spacer flange. There may also be several openings, which are then preferably distributed evenly around the rotation axis in the circumferential direction. The shape can also be achieved by a spring element described in more detail below.

Alternatively, a material weakening can be achieved by a combination of different materials and/or a combination of identical materials with different properties. Different metals can be joined together to form a bimetal. Material weakening can also be achieved by mixing two or more materials, in particular two or more metals. Materials that are similar in themselves and have different properties can be obtained, for example, by different methods of production and/or processing, such as soft annealing, foaming and/or laser sintering.

Alternatively or additionally, the first region of the bearing assembly may be less elastic than the second region due to its shape. This can be achieved, for example, by at least reinforcing the first region. Such reinforcements can be molded directly in the first region. For example, at least one rib can be formed in the first region. The first region may in particular be a casting. Alternatively or additionally, at least one reinforcement can be attached to the first region, e.g. glued, welded, soldered or screwed to it.

Due to the inventive design, the gas gap formed between the bearing assembly and shaft can remain very constant even at high rotational speeds and/or high temperatures and/or high temperature differences and/or other particularly variable operating influences, such as variable gas pressures or centrifugal forces. The rotary system can therefore also be operated under these conditions without the risk of excessive deformation of the gas gap. This is because the part of the bearing assembly that supports the shaft can then be rather rigid overall, so that, for example, the bearing surface of the bearing assembly remains comparatively round and cylindrical even if the housing is distorted. Due to its relatively more elastic design, the second region allows a certain play of the first region in relation to the distorting housing.

It is particularly advantageous if the radial bearing sleeve is designed in one piece. This prevents deformation of the inside of the radial bearing sleeve even more effectively and thus keeps the gas gap constant.

It is appropriate that the second region of the bearing assembly is more elastic in the radial direction than the first region, at least due to its shape and/or due to the shape of its first region. This can increase the roundness and cylindricity of the shaft and the first region of the bearing assembly. It is also advantageous if the second region of the bearing assembly is more elastic in the axial direction than the first region, at least as a result of its shape and/or the shape of its first region. This can reduce the risk that the first region of the bearing assembly that supports the shaft will tilt with respect to the rotational cause.

In order to further support the inventive property that the second region of the bearing assembly is more elastic than its first region, the second region of the bearing assembly may consist of a more elastic material than its first region.

In some embodiments, the first region forms a radially inner region of the bearing assembly, the second region forms a radially central region of the bearing assembly, and the third region forms a radially outer region of the bearing assembly. The second region is thus located radially outside the first region, and the third region is located radially outside the second region.

In other embodiments according to the invention, the second region of the bearing assembly can extend in the axial direction from the third region of the bearing assembly. This embodiment is characterized by a smaller installation space, especially in the axial direction.

The second region of the bearing assembly may also be more elastic than its third region, at least due to its shape and/or the shape of its third region. In this way, the bearing assembly can be more securely attached to the housing.

In a possible variant, the second region of the bearing assembly can be more elastic than the third region due to a fastening to the housing. In this variant, the third region may be more elastic in itself than the second region, provided that the attachment reduces this elasticity to such an extent that the second region is more elastic than the third region.

On its outside, the radial bearing sleeve can have at least one cooling structure with the aid of which the radial bearing sleeve can be cooled. Alternatively or additionally, the radial bearing sleeve may have at least one recess on its outside, such as a notch or a milled recess, and/or at least one projection, such as a web, which may run, for example, in the circumferential direction. This can influence the gas flow on the outside of the radial bearing sleeve.

The second region of the bearing assembly may be formed by an inner section of a spacer flange to which the first region of the bearing assembly, in particular the radial bearing sleeve described above, is connected. In particular, the inner section of the spacer flange may be attached to the first region of the bearing assembly, in particular to the radial bearing sleeve. Alternatively, it is also within the scope of the invention that the inner section of the spacer flange is connected in one piece to the first region of the bearing assembly, in particular to the radial bearing sleeve. Such a one-piece connection can be achieved, for example, by laser sintering.

In preferred configurations, the inner section of the spacer flange has at least one spring element whose shape makes the second region of the bearing assembly more elastic than the first region of the bearing assembly. The spring element may contain at least one spring section of the inner section of the spacer flange extending transversely (i.e. not parallel) to the radial direction. The spring section can be rotationally symmetrical with respect to the axis of rotation, for example cylindrical or conical. The spring element preferably contains two spring sections extending transversely to the radial direction, which extend in opposite axial directions. In this way, the installation space in the axial direction is increased; however, a greater distance in the radial direction can be achieved and consequently a particularly high elasticity in the radial direction.

The spring section can protrude axially from a radially outer section of the spacer flange held by the housing. Alternatively, the spring section may be axially offset from a radially outer section of the spacer flange held by the housing. In a comparatively simple way, both variants provide an elasticity of the second region which, according to the invention, is higher than that of the first region.

The inner section of the spacer flange preferably contains a sleeve-shaped section which is connected in at least one axial end region to an axial end region of the spring section. This also supports the elasticity of the second region of the bearing assembly in an advantageous way.

The sleeve-shaped section of the spacer flange is preferably designed as a single piece with or connected to a radial bearing sleeve supporting the shaft in the radial direction, in particular with a radial bearing sleeve as described above. This connection can be achieved, for example, by a shrink connection, a solder connection, a welded connection, an adhesive connection, a plastic cast connection, a knurled connection, a laser sintered connection, by hydraulic pressing, by a clamping connection, by a crystallization connection, by a polygonal connection, by a press connection, by a threaded connection or a combination thereof.

Preferably the third region of the bearing assembly is formed by a radially outer section of the spacer flange held by the housing. A one-piece spacer flange can therefore form both the second region and the third region of the bearing assembly.

The second region, in particular the inner section of the spacer flange, may be shaped such that the first region of the bearing assembly, in particular an inner side of the radial bearing sleeve, exhibits a maximum radial deformation of 50 µm, preferably 10 µm, in particular 1 µm, under specified operating conditions. This maximum radial deformation is preferably not exceeded under any intended operating conditions. The specified operating conditions can, for example, cover a temperature range from 50° C. to 250° C. and a speed range from 1 $min^{-1}$ to 500,000 $min^{-1}$, preferably a temperature range from 160° C. to 600° C. and a speed range from 1 $min^{-1}$ to 1,000,000 $min^{-1}$, particularly preferred even a temperature range from 273.15° C. to 3,100° C. and a speed range from 1 $min^{-1}$ to 2,500,000 $min^{-1}$.

The bearing assembly may have at least one cooling channel. For example, there may be a cooling channel in the spacer flange, which may extend in a radial direction or be helical. Alternatively or additionally, a cooling channel may be formed between the spring section and the radial bearing sleeve, in particular between the spring section and the sleeve-shaped section. This cooling channel can, for example, extend in the circumferential direction or be helical. With the help of such cooling channels, the temperature distribution within the rotary system can be adjusted. This can make a further contribution to keeping the gas gap of the gas bearing as constant as possible. A cooling channel formed in the spacer flange in the radial direction is particularly preferred as it flows into a cooling channel running in the circumferential direction between the spring section and the radial bearing sleeve. At least one cooling channel can also be provided in a radial bearing sleeve and/or in the housing.

Alternatively or in addition to a spacer flange, the second region of the bearing assembly can be in the form of a sleeve. At the first axial end of this sleeve, a first extension can be formed in the radial inward direction, which holds a radial bearing sleeve. At a second axial end of the sleeve which is opposite the first axial end, a second extension can be formed in the radial outward direction which forms the third region of the bearing assembly and which is held by the housing or integrated on or in the housing. This design is characterized by a smaller installation space, especially in the axial direction.

The components of the bearing assembly may contain or consist of various materials, such as ceramics, hard metal (optionally coated with chrome steel, especially nitrided), graphite, titanium, chrome steel, aluminum, steel materials, nickel-based alloys (such as Inconel®) or plastics, such as polyimide (such as Torlon®), especially fiber-reinforced plastics, such as PEEK reinforced with carbon fibers. It is conceivable that the different components of one and the same bearing assembly contain or consist of different materials. The radial bearing sleeve is preferably made of ceramic and/or tungsten carbide.

The rotary system in accordance with the invention may be an in particular electrically driven turbomachine, such as for example a compressor, in particular a turbo compressor, an engine or a generator, a turbine, in particular a turbo generator or a turbocharger, a coupling system (in particular a magnetic coupling) or a flywheel, in particular a kinetic accumulator or in particular a gas-driven turbine or a combination thereof.

Figure 3:
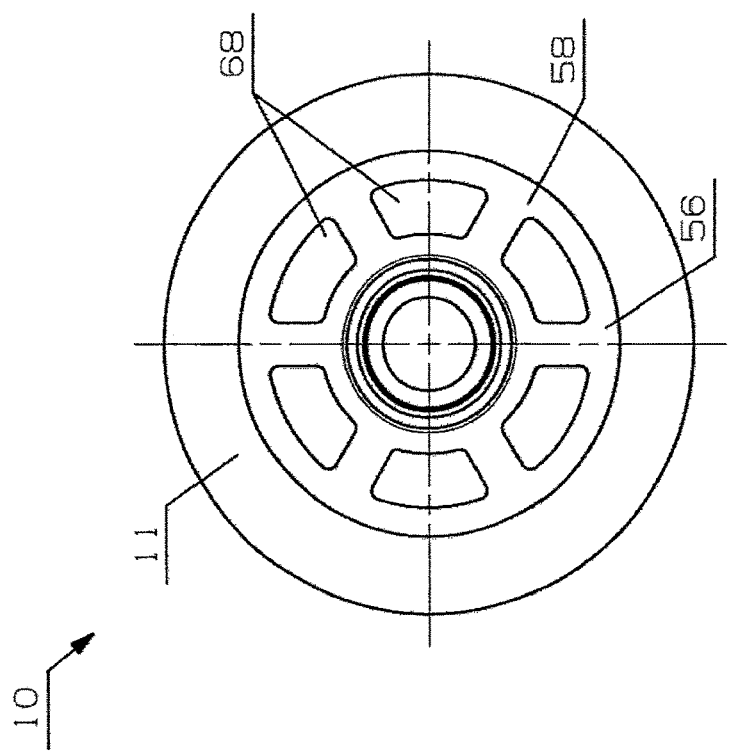
Figure 2:
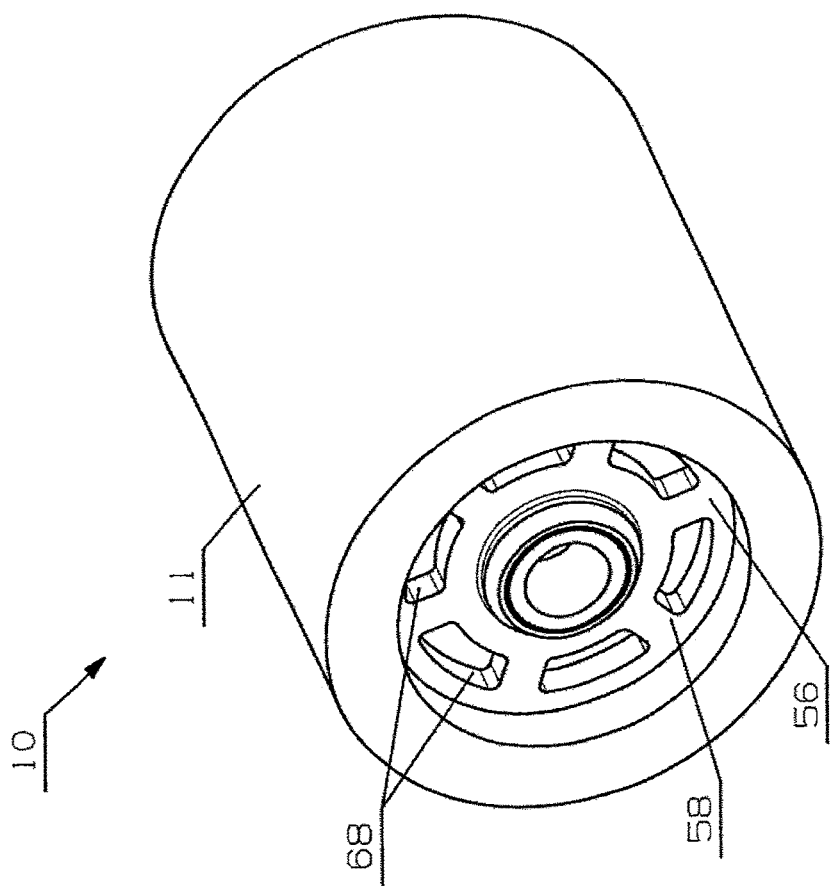
Figure 4:
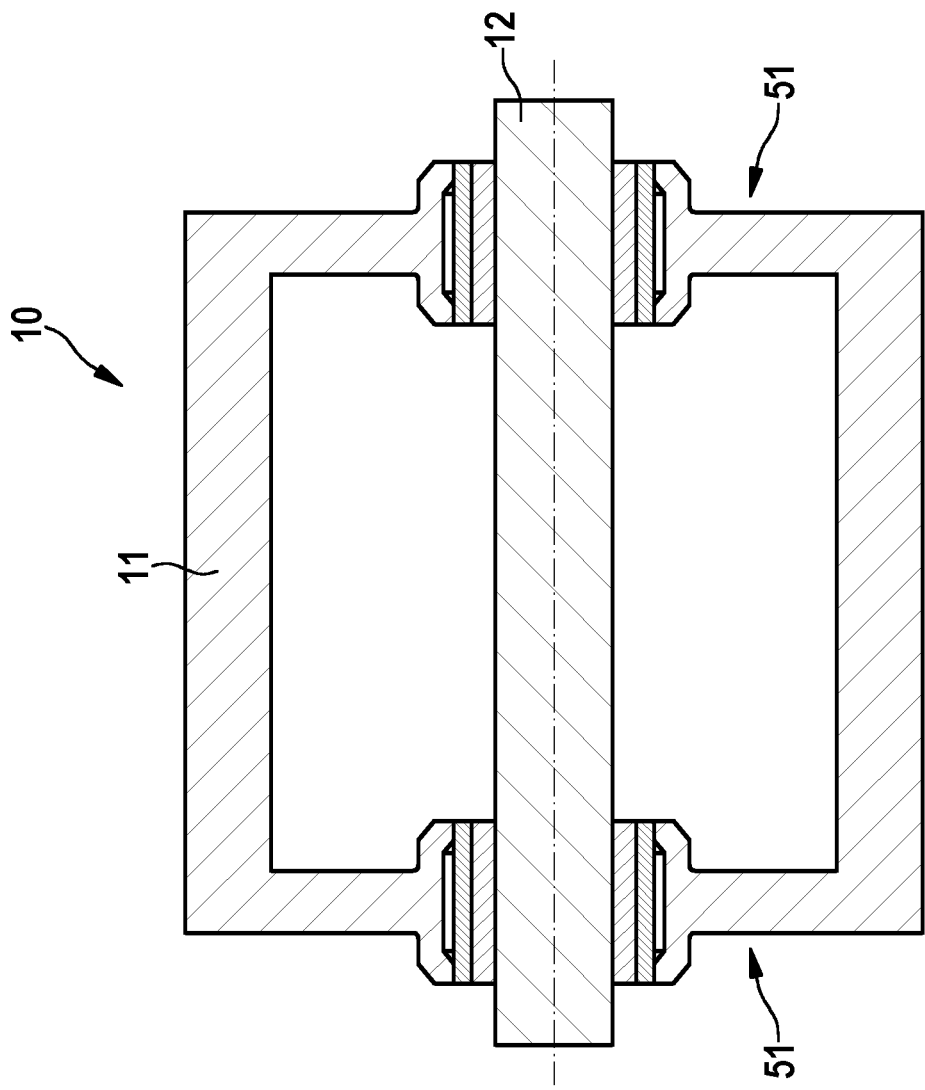
Figure 6:
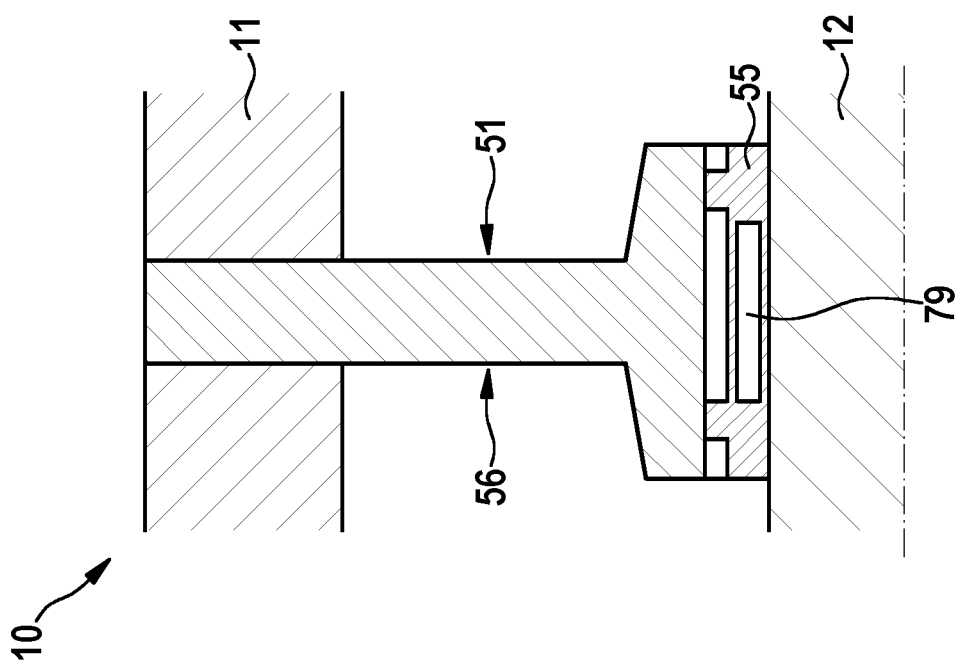
Figure 5:
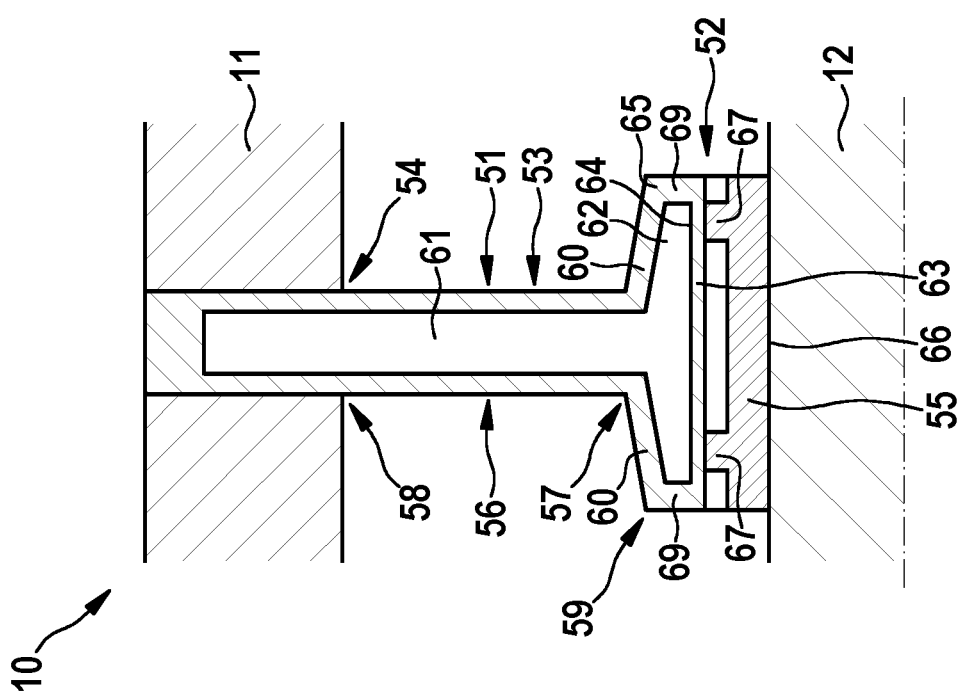
Figure 8:
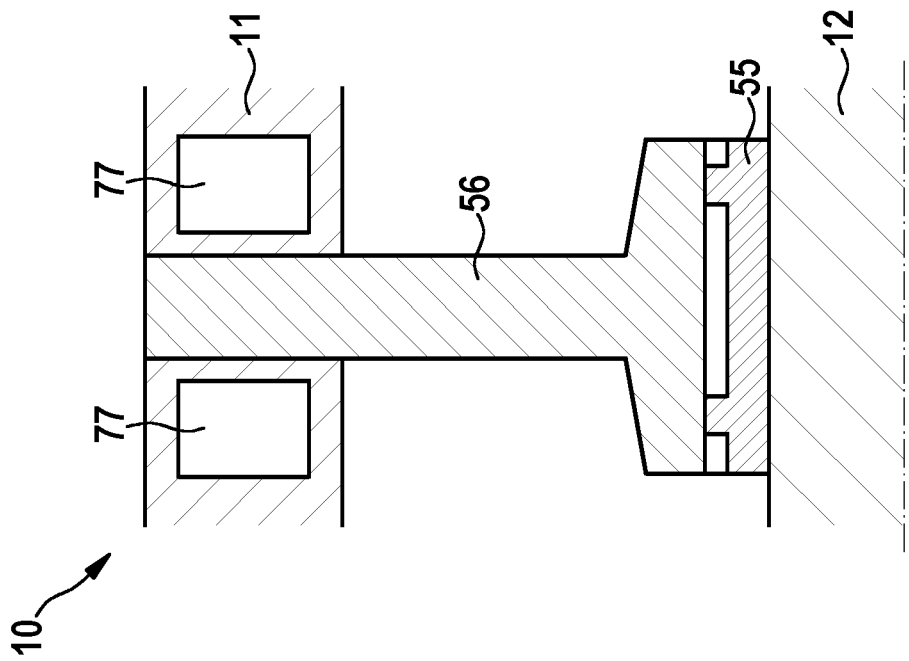
Figure 7:
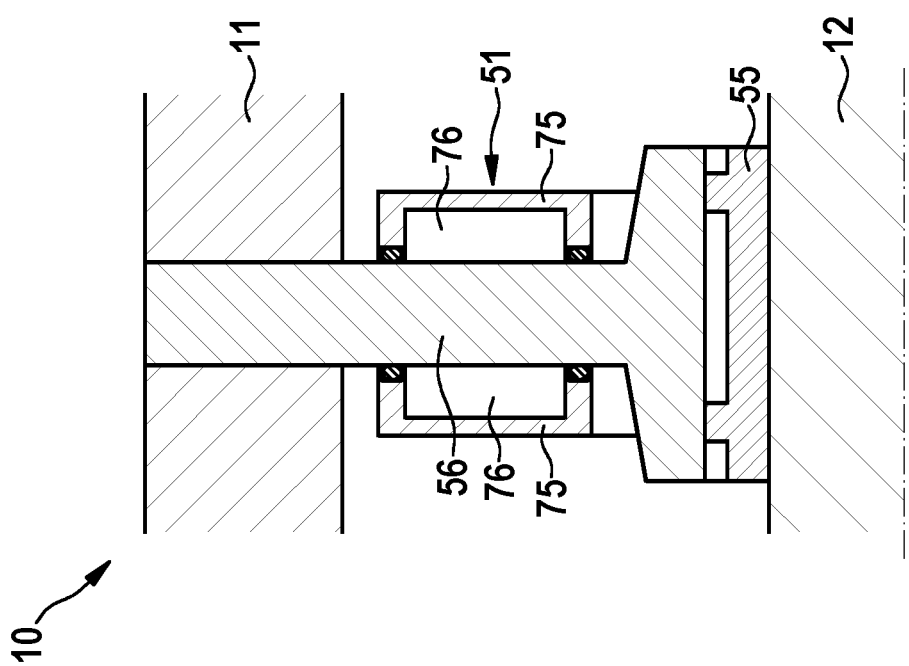
Figure 10:
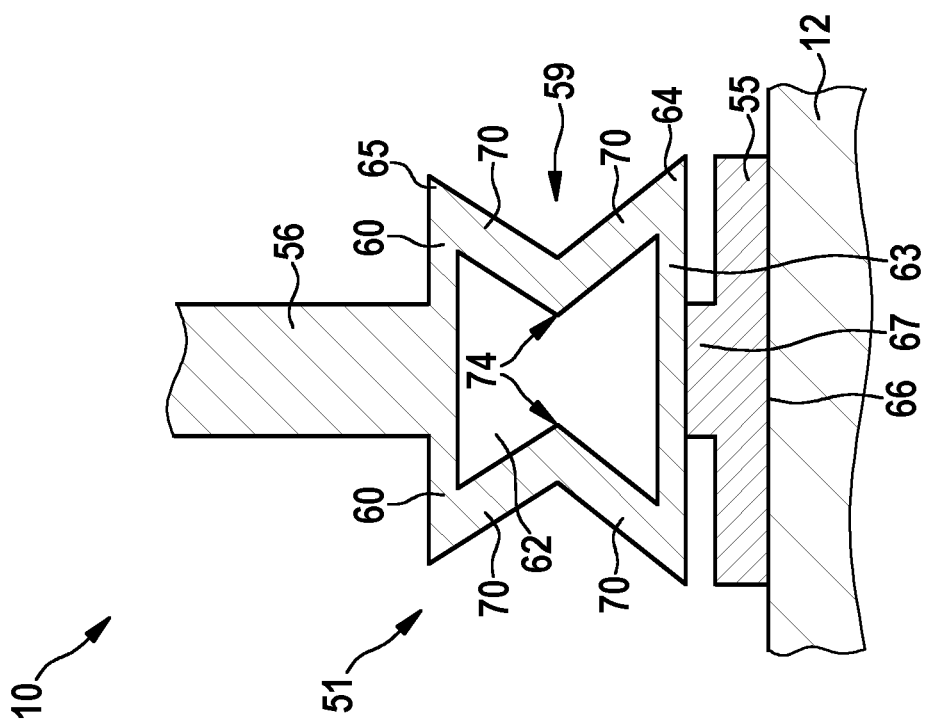
Figure 9:
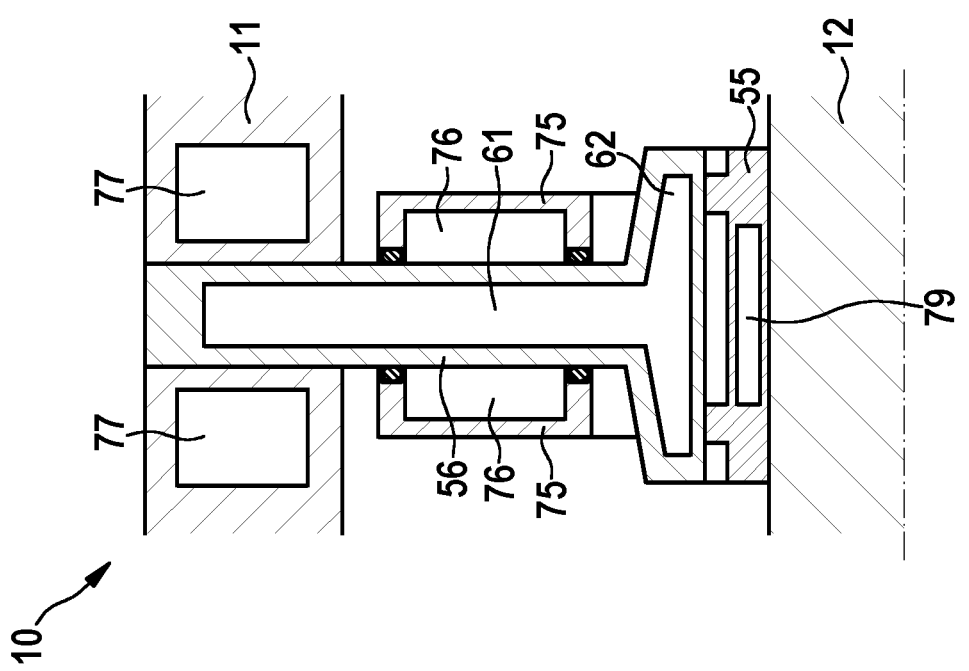
Figure 12:
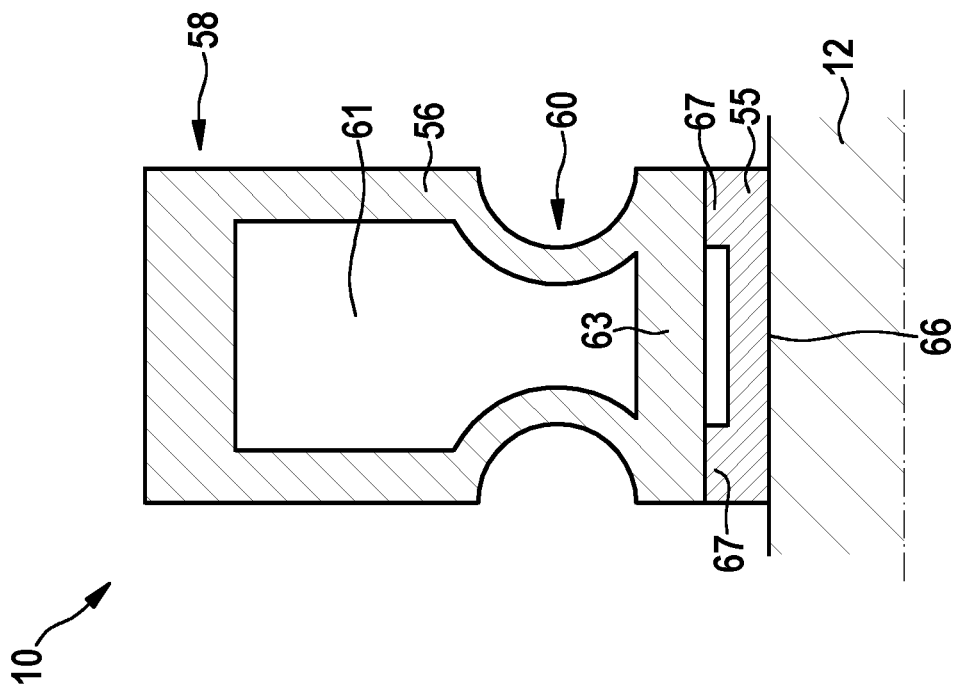
Figure 11:
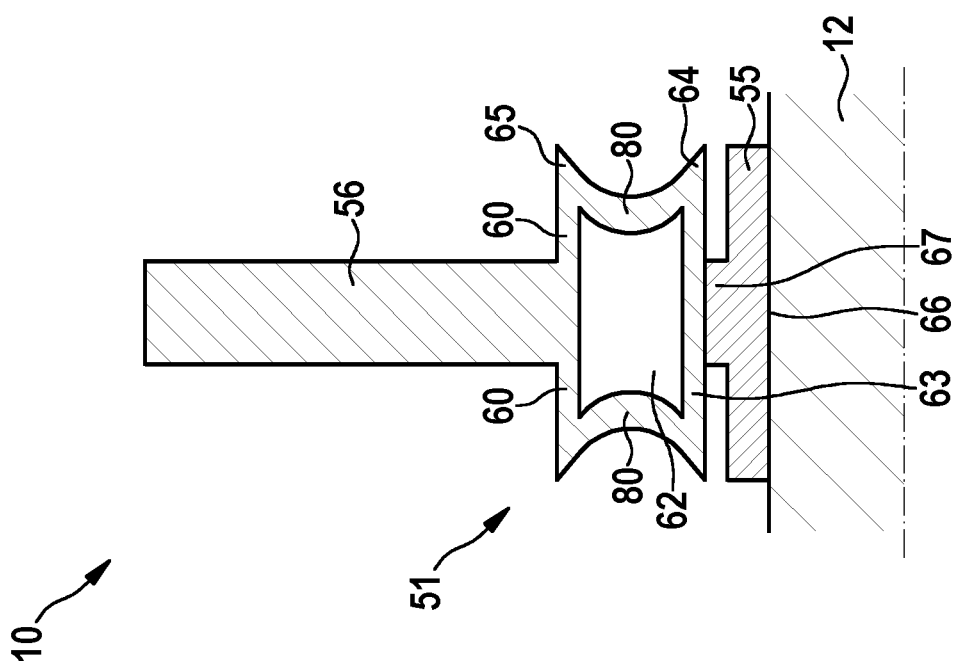
Figure 13:
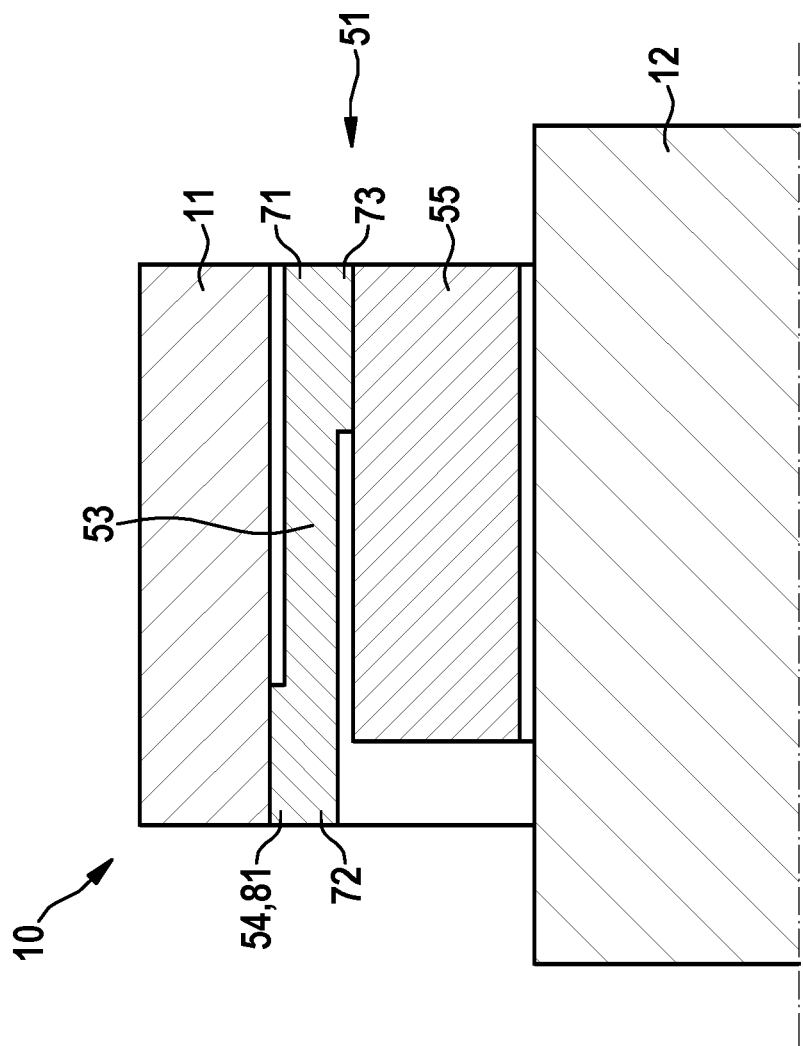

In the following, the invention and its advantages will be explained in more detail by means of several embodiments and drawings. In the figures, FIG. 1: shows a lateral sectional view through a section of a first rotary system according to invention;

FIG. 2: shows a perspective view of the first rotary system according to the invention, but without the shaft;

FIG. 3: shows a plan view in axial direction of the first rotary system according to the invention without the shaft;

FIG. 4: shows a lateral sectional view of the first rotary system according to the invention without the shaft along the section line A-A in FIG. 3;

FIG. 5: shows a schematic lateral cross-sectional view of a bearing assembly of a second rotary system according to the invention;

FIG. 6: shows a schematic lateral cross-sectional view of a bearing assembly of a third rotary system according to the invention;

FIG. 7: shows a schematic lateral cross-sectional view of a bearing assembly of a fourth rotary system according to the invention;

FIG. 8: shows a schematic lateral cross-sectional view of a bearing assembly of a fifth rotary system according to the invention;

FIG. 9: shows a schematic lateral cross-sectional view of a bearing assembly of a sixth rotary system according to the invention;

FIG. 10: shows a schematic lateral cross-sectional view of a bearing assembly of a seventh rotary system according to the invention;

FIG. 11: shows a schematic lateral cross-sectional view of a bearing assembly of an eighth rotary system according to the invention;

FIG. 12: shows a schematic lateral cross-sectional view of a bearing assembly of a ninth rotary system according to the invention;

FIG. 13: shows a lateral cross-sectional view through a section of a tenth rotary system according to the invention.

The first rotary system according to the invention shown in FIGS. 1 to 4 is a turbo compressor. This compressor contains a housing 11, a shaft 12 rotatable relative to the housing and a bearing assembly 51 which supports the shaft 12 relative to the housing 11 by a radial gas bearing. A compressor wheel 78 is attached to one end of the shaft 12. The gas bearing is provided by a gas gap, in particular an air gap, which is formed between the shaft 12 and a radial bearing sleeve 55 described in detail below.

The bearing assembly 51 contains a first radially inner bearing region 52 formed by the radial bearing sleeve 55 and supporting the shaft 12. The bearing assembly 51 also includes a third radially outer region 54 held by the housing 11, and a second radially central region 53 connecting the first region 52 to the third region 54.

The bearing assembly 51 includes a spacer flange 56 with an inner section 57 and an outer section 58. The inner section 57 forms the second region 53 of the bearing assembly 51. This inner section 57 has a spring element 59, the shape of which makes the second region 53 of the bearing assembly 51 more elastic than its first region 52 (i.e. the radial bearing sleeve 55). In detail, the spring element 59 contains two cylindrical-shell spring sections 60 extending in opposite axial directions. In the axial direction, each of the spring sections 60 projects beyond the radially outer section 58 of the spacer flange 56. The inner section 57 of the spacer flange 56 further includes a sleeve-shaped section 63 which is connected in two opposite axial end regions 64 to an axial conical end region 65 of each of the spring sections 60. This structure (and also the openings explained in FIGS. 2 and 3 below) is one of the reasons why the second region 53 of bearing assembly 51 (i.e. the inner section 57 of the spacer flange 56) is more elastic than its first region 52 (i.e. the radial bearing sleeve 55).

On the inside of the sleeve-shaped section 63, two webs 67 running in the circumferential direction are formed, which are spaced apart in the axial direction and arranged symmetrically. At these webs 67, the sleeve-shaped section 63 is connected with the radial bearing sleeve 55. This can be achieved, for example, by means of a press connection. Alternatively, it is of course also conceivable that the webs are formed on the outside of the radial bearing sleeve, to which the radial bearing sleeve 55 is attached to the sleeve-shaped section 63. The webs 67 allow the radial bearing sleeve 55 to be clamped in a specific circumferential manner. The contact surfaces on which the webs 67 rest can be circumferential or even sectorally interrupted. The contact surfaces extend the middle elastic region and promote thermal management. The webs can be mounted inside or outside. From a technical point of view, the solutions are quite equivalent, but from a production point of view, depending on the design, one or the other variant can offer advantages.

The radial bearing sleeve 55 has a circular cylinder shell and is therefore tubular. The inside of the radial bearing sleeve 55 has a bearing surface 66. Between this bearing surface 66 and the shaft 12 the mentioned gas gap is formed, which provides the gas bearing of the shaft 12 within the bearing surface 66.

In this embodiment, the second region 53 of the bearing assembly 51, i.e. the inner section 57 of the spacer flange 56, is shaped in such a way that the inside of the radial bearing sleeve 55 has a maximum radial deformation of 50 µm, preferably 10 µm, particularly preferably 1 µm under specified operating conditions. This maximum radial deformation is preferably not exceeded under any intended operating conditions. The specified operating conditions can, for example, cover a temperature range from 50° C. to 250° C. and a speed range from 1 $min^{-1}$ to 500,000 $min^{-1}$, preferably a temperature range from 160° C. to 600° C. and a speed range from 1 $min^{-1}$ to 1,000,000 $min^{-1}$, particularly preferred even a temperature range from 273.15° C. to 3,100° C. and a speed range from 1 $min^{-1}$ to 2,500,000 $min^{-1}$.

The spacer flange 56 preferably consists of aluminum, steel, chrome steel and the radial bearing sleeve 55 preferably consists of hard metal, ceramic, coated steel, coated titanium or aluminum. This special material combination (in addition to the openings and the spring element 59) also contributes to the fact that the second region 53 is more elastic than the first region 52. Due to its shape, the second region 53 in this design example is also more elastic than the third, outer region 54.

The spacer flange 56 has six cooling channels 61 extending in a radial direction, of which only one can be seen in FIG. 1. The bearing assembly 51 further includes a circumferentially extending cooling channel 62 between the spring section 60 and the sleeve-shaped section 33, into which the six radial cooling channels 61 open. Of course, a different number of cooling channels 61 may also be available.

As can be seen from the perspective view in FIG. 2, the outer section 58 of the spacer flange 56 has six uniformly distributed openings 68 in the circumferential direction which penetrate it in the axial direction. As a result, the outer section 58 of the spacer flange 56 receives a geometric material weakening. This special shape ensures (in addition to the spring element 59) that the second region 53 of the bearing assembly 51 is more elastic its first region 52.

FIG. 3 shows a plan view of the turbo compressor 10 in the axial direction. As in FIG. 2, the shaft is not shown here. One of the radial cooling channels 61 which is not visible here extends between two adjacent openings 68.

FIG. 4 is a lateral cross-sectional view along line A-A in FIG. 3, but here with the shaft 12. The turbo compressor 10 contains two bearing assemblies 51 arranged at an axial distance, which are symmetrical to each other.

The form of execution shown in FIGS. 1 to 4 has the advantage of a comparatively high degree of elasticity.

FIGS. 5 to 12 show schematic lateral sectional views of eight further bearing assemblies of rotary systems according to the invention.

In the second embodiment shown in FIG. 5, in contrast to the first embodiment, no webs are formed on the inside of the sleeve-shaped section 63, but on the outside of the radial bearing sleeve 55. In addition, the spring element 59 contains two sections 69 extending in the radial direction between the end regions 64 of the sleeve-shaped section 63 and the axial end regions 65 of the spring section 60. In addition, the spring sections 60 here are not designed in the form of a cylinder jacket, but in the form of a cone jacket.

In FIG. 6, the radial bearing sleeve 55 contains a cooling channel 79 extending in the circumferential direction, which can be used to cool the radial bearing sleeve 55 and an adjacent region of the shaft 12.

In the embodiment shown in FIG. 7, two cooling flanges 75 are mounted on the spacer flange 56, which together with one axial end face each of the spacer flange 56 enclose a cooling channel 76 extending in the circumferential direction. This allows the spacer flange 56 to be cooled.

In the embodiment shown in FIG. 8, the housing 11 contains two cooling channels 77 running in the circumferential direction in the region of the spacer flange 56, whereby the housing 11 can be cooled.

Of course, any combination of the cooling structures shown in FIGS. 5 to 8 is also possible. For example, a sixth embodiment is shown in FIG. 9, which has a radial bearing sleeve 15 with a cooling channel 79, a cooling channel 61 extending in the radial direction in the spacer flange 56, two cooling flanges 75 mounted on the spacer flange 56 and two cooling channels 77 running in the housing 11.

In FIG. 10, the radial bearing sleeve 55 contains only one single web 67 which is arranged centrally in the axial direction. Four tapered sections 70 extend between the cylindrical-shell spring sections 60 and the sleeve-shaped section 63. Two axially outer ones of these tapered sections 70 are connected to the spring sections 60, and two axially inner ones of these tapered sections 70 are connected to the sleeve-shaped section 63. In an axially central region between the spring sections 60 and the sleeve-shaped section 63, two of the tapered sections 70 are connected to each other in a connection region 74. These connection regions 74 are set back in the axial direction compared to the axial end regions 64, 65 of the sleeve-shaped section 63 and the spring section 60. A cooling channel 62 extending in the circumferential direction is formed between the spring sections 60, the sleeve-shaped section 63 and the tapered section 70. This design requires less installation space in the axial direction and can be used if there is more clearance in the radial direction.

In FIG. 11, instead of the tapered sections 70 of FIG. 10, there are two curved sections 80 which extend between the cylindrical spring sections 60 and the sleeve-shaped section 63. This also creates a cooling channel 62 running in the circumferential direction. This design also requires less installation space in the axial direction and can be used if there is more clearance in the radial direction.

FIG. 12 shows another example. Here, webs 67 are formed on the outside of the radial bearing sleeve 55, which webs 67 are each located at the axial ends. Here a spring section 60 is set back in the axial direction compared to a radially outer section 58 of the spacer flange 56. This design offers significantly more space for the cooling channels, which is advantageous for reducing pressure losses.

FIG. 13 shows a side view of a section of a tenth rotary system 10 according to the invention. In contrast to the ones described above, this embodiment does not contain a spacer flange. Instead, the second region 53 of the bearing assembly 51 here has the shape of a sleeve. At the first axial end of this sleeve 53, a first extension 73 is formed in the radial inward direction, which holds a radial bearing sleeve 55. At a second axial end 72 of the sleeve 53, which is opposite the first axial end 71, a second extension 81 is formed in the radial outward direction, which forms a third region 54 of the bearing assembly 51 and which is held by the housing 11. This design is characterized by a smaller installation space, especially in the axial direction.

The invention claimed is:

1. A rotary system with at least one radial gas bearing comprising:
    a housing,
    a shaft rotatable relative to the housing,
    at least one bearing assembly which has a first region and supporting the shaft relative to the housing by a radial gas bearing in which a gas gap is formed between the bearing assembly and the shaft, and
    the first region including or being formed by a tubular radial bearing sleeve, an inside of which has a bearing surface within which the shaft is supported in a radial direction,
    wherein the bearing assembly further comprises a third region held by the housing or integrated on or in the housing, and a second region connecting the first region to the third region, and the second region being more resilient than the first region at least due to one of a shape of the second region and a shape of the first region.

2. The rotary system according to claim 1, wherein the radial bearing sleeve is formed as one piece.

3. The rotary system according to claim 1, wherein the second region of the bearing assembly comprises a material which is more elastic than its first region.

4. The rotary system according to claim 1, wherein the first region forms a radially inner region of the bearing assembly, the second region forms a radially central region of the bearing assembly, and the third region forms a radially outer region of the bearing assembly.

5. The rotary system according to claim 1, wherein the second region is more elastic than the third region at least due at least one of the shape of the second region and the shape of the third region.

6. The rotary system according to claim 1, wherein the second region of the bearing assembly is formed by an inner section of a spacer flange to which the first region of the bearing assembly is connected.

7. The rotary system according to claim 6, wherein the inner section of the spacer flange has at least one spring element, a shaping of which makes the second region of the bearing assembly more elastic than the first region of the bearing assembly.

8. The rotary system according to claim 7, wherein the spring element includes at least one spring section of the inner section of the spacer flange which extends transversely to the radial direction.

9. The rotary system according to claim 8, wherein the spring section projects in an axial direction beyond a radially outer section of the spacer flange held by the housing.

10. The rotary system according to claim 8, wherein the spring section is set back in an axial direction from a radially outer section of the spacer flange held by the housing.

11. The rotary system according to claim 8, wherein the inner section of the spacer flange contains a sleeve-shaped section which is connected, in at least one axial end region, to an axial end region of the spring section.

12. The rotary system according to claim 11, wherein the sleeve-shaped section is integrally formed with or connected to a radial bearing sleeve which supports the shaft in the radial direction.

13. The rotary system according to claim 6, wherein the third region of the bearing assembly is formed by a radially outer section of the spacer flange held by the housing.

14. The rotary system according to claim 1, wherein the second region is formed in such a way that, under specified operating conditions, the first region has a maximum radial deformation of 50 μm.

15. The rotary system according to claim 1, wherein the bearing assembly has at least one cooling channel which extends in the radial direction.

16. The rotary system according claim 1, wherein the bearing assembly has at least one cooling channel which extends in a circumferential direction.

17. The rotary system according to claim 1, wherein the shape of the second region is formed by a geometric material weakening of the second region.

18. The rotary system according to claim 17, wherein the geometric material weakening of the second region is at least one recess formed in the axial direction or at least one opening penetrating the bearing assembly.

19. The rotary system according to claim 1, wherein the second region of the bearing assembly is in a form of a sleeve, a first extension holding a radial bearing sleeve is integrally formed on a first axial end of the sleeve in the radial inward direction, and a second extension, which forms the third region and which is held by the housing or integrated on or in the housing, is integrally formed in the radial outward direction on a second axial end of the sleeve which lies opposite the first axial end.

* * * * *